Patented July 18, 1933

1,918,317

UNITED STATES PATENT OFFICE

RAYMOND C. BENNER AND HENRY N. BAUMANN, JR., OF NIAGARA FALLS, NEW YORK, ASSIGNORS, BY MESNE ASSIGNMENTS, TO THE GLOBAR CORPORATION, OF NIAGARA FALLS, NEW YORK, A CORPORATION OF NEW YORK

ELECTRICAL RESISTOR ROD

No Drawing. Application filed October 24, 1927. Serial No. 228,492.

This invention relates to electrical resistors, and especially to resistors for electric heating devices of various kinds. The invention relates more specifically to a composition resistor, such for example as those made of silicon carbide or graphite or mixtures of these two materials and which are capable of operating at temperatures considerably above the range of commercial wire resistors, such for example as nickel chrome alloy and chromium iron alloys.

The principal obstacle in the way of the development of electrical heating of certain types by means of resistance elements has been the comparatively low temperatures at which the resistors have to be used in order that they may have a reasonably long life. The objection to the use of electrical cook stoves when compared with gas stoves is the time which is required to bring the material to be cooked up to temperature. This, of course, is the direct result of the low temperature at which the resistor element must be used.

Resistors made from silicon carbide, graphite, or other mixtures, when used above the red heat soon become useless due to the increase in resistance caused by the gradual oxidation of the silicon carbide or graphite or the destruction of the bonds in the composition by the reduction of the silicon dioxide or other oxygen containing compounds by the reducing action of the silicon carbide, carbon, carbon monoxide, etc., present.

According to the present invention these difficulties are overcome and a resistor is provided which can be operated at temperatures of above 1,000° to 1,100° C., which is the upper limit of metallic resistors now generally used. According to the present invention silicon carbide or graphite, or the mixture of these substances, and other oxidizable substances are protected by a glaze which is inert to the action of SiC, C, CO, etc., at high temperatures, especially temperatures above 1,100 C. and at least up to the softening point of said glaze. These glazes may be formed by a single compound, or a mixture of compounds, depending upon the character of the composition desired to meet a certain condition.

In the practice of our invention the glazes to be used in the resistor rods are prepared by grinding the glaze material in a pebble mill until it will pass through a 150 mesh screen. After grinding, the glaze is mixed with a temporary bond of similar fineness. This temporary bond may be in the nature of glucose, dextrin, glutrin or the like. If the protective material is to be used purely as a glaze water enough is added to make a workable slip and the mixture is applied to the previously formed resistor by dipping, spraying or brushing, or by otherwise suitably coating the outside of the resistor.

We have found that the effective life of resistor rods, particularly at temperatures above 1100° C. can be increased 25–50% or more by the use of a suitable binder or glaze.

We have found that glazes which are free of $SiO_2$ are particularly effective because $SiO_2$ is reduced by SiC, C or CO, forming Si, which volatilizes.

A number of radically different glazes may be effectively employed. One type, comprising alkaline earth halides such as barium chloride or calcium fluoride are highly satisfactory. Calcium fluoride, for instance, is highly desirable because it matures between 1400° C. and 1500° C. A mixture of rutile ($TiO_2$) 30% and alumina ($Al_2O_3$) 70% may be used. Another type of glaze or bond, comprises lime (CaO) 80% and rutile ($TiO_2$) 20%. This glaze matures at about Cone 19 (1500° C.) Another type of protective material comprises fluorspar ($CaF_2$) 20% and bone ash—$Ca_3(Po_4)_2$ 80%. This glaze matures at about Cone 26 (1600° C.). Another material of the same type is a mixture of fluorite ($CaF_2$) 30% and alumina ($Al_2O_3$) 70%.

Barium chloride, calcium fluoride and cryolite may be used in combination. Various other combinations are possible with resistors of different types, the examples above given being typical.

We claim:

1. An electrical resistance rod, composed mainly of silicon carbide, and a surface glaze therefor containing titanium oxide up to but not substantially in excess of thirty percent, the remainder of the glaze being composed of alumina, said glaze being in the form of a surface coating independent of any bond in the article.

2. An electrical resistance rod, composed mainly of silicon carbide, and a surface glaze therefor forming an exterior coating which is separate from any bond in the rod containing 20 percent or less of titanium oxide, the remainder of the glaze being composed of calcium oxide.

3. An electrical resistance rod comprised mainly of silicon carbide and having a surface glaze thereover separate from the ingredients of the rod, said glaze containing titanium oxide not substantially in excess of 30%, the remainder of the glaze being comprised principally of at least one refractory oxide of a metal other than titanium.

4. As an article of manufacture, a silicon carbide resistor having an externally applied surface glaze thereover, which glaze is free of silicon compounds and contains titanium oxide and alumina.

5. As an article of manufacture, a silicon carbide resistor having an externally applied surface glaze thereover, which glaze is free of silicon compounds and contains titanium oxide and calcium oxide.

6. A silicon carbide resistor having an externally applied surface glaze thereover, which glaze is free of silica compounds and contains compounds of titanium oxide.

RAYMOND C. BENNER.
HENRY N. BAUMANN, Jr.